(12) United States Patent
Yager et al.

(10) Patent No.: US 9,881,341 B1
(45) Date of Patent: Jan. 30, 2018

(54) SYSTEMS AND METHODS FOR CUSTOMIZING INSURANCE

(71) Applicant: Allstate Insurance Company, Northbrook, IL (US)

(72) Inventors: Floyd M. Yager, Park Ridge, IL (US); Thomas J. Wilson, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 786 days.

(21) Appl. No.: 14/139,048

(22) Filed: Dec. 23, 2013

Related U.S. Application Data

(63) Continuation of application No. 13/730,079, filed on Dec. 28, 2012, which is a continuation of application No. 13/353,218, filed on Jan. 18, 2012, which is a continuation of application No. 11/774,442, filed on Jul. 6, 2007, which is a continuation of application No. 11/270,611, filed on Nov. 10, 2005, now abandoned.

(60) Provisional application No. 60/629,318, filed on Nov. 19, 2004.

(51) Int. Cl.
*G06Q 40/02* (2012.01)
*G06Q 40/08* (2012.01)

(52) U.S. Cl.
CPC .................. *G06Q 40/08* (2013.01)

(58) Field of Classification Search
CPC ..... G06Q 30/0283; G06Q 40/08; G06Q 40/02
USPC ........................................................... 705/4
See application file for complete search history.

(56) References Cited

U.S. PATENT DOCUMENTS

| | | | |
|---|---|---|---|
| 5,893,072 A | 4/1999 | Zizzamia | |
| 5,950,169 A * | 9/1999 | Borghesi | G06Q 30/0283 705/4 |
| 5,963,951 A | 10/1999 | Collins | |
| 6,795,759 B2 | 9/2004 | Doyle | |
| 7,774,217 B1 | 8/2010 | Yager et al. | |
| 2001/0042002 A1 | 11/2001 | Koopersmith | |
| 2002/0002475 A1* | 1/2002 | Freedman | G06Q 40/02 705/4 |
| 2002/0002502 A1 | 1/2002 | Maes et al. | |
| 2002/0032586 A1 | 3/2002 | Joao | |
| 2002/0087364 A1 | 7/2002 | Lerner et al. | |

(Continued)

FOREIGN PATENT DOCUMENTS

WO 2002015079 A1 2/2002

OTHER PUBLICATIONS

Timoteo, "A Total Loss", Aug. 1, 2002, Canadian Underwriter, pp. 1-4.*

(Continued)

*Primary Examiner* — Joy Chng
(74) *Attorney, Agent, or Firm* — Banner & Witcoff, Ltd.

(57) ABSTRACT

System and methods provide customizable insurance according to consumer preferences. Demand simulators guide the creation of optimized packages of features, which consumers may select from to form an insurance product appropriate for their particular needs. Packages may be formed with a particular appeal to consumers with common needs, wants, or characteristics. In addition, methods and systems are provided for presenting insurance products for consideration by customers over a network. Presented insurance products may be formed through an optimization process or according to customer preferences.

28 Claims, 8 Drawing Sheets

(56) References Cited

U.S. PATENT DOCUMENTS

| | | | |
|---|---|---|---|
| 2002/0099596 A1 | 7/2002 | Geraghty | |
| 2002/0120474 A1 | 8/2002 | Hele | |
| 2002/0161779 A1 | 10/2002 | Brierly et al. | |
| 2002/0188484 A1* | 12/2002 | Grover | G06Q 40/08 705/4 |
| 2002/0194033 A1 | 12/2002 | Huff | |
| 2003/0105682 A1 | 6/2003 | Dicker et al. | |
| 2003/0139985 A1* | 7/2003 | Hollar | G06Q 30/06 705/30 |
| 2003/0171959 A1* | 9/2003 | Galloway | G06Q 40/08 705/4 |
| 2004/0039609 A1 | 2/2004 | Burkitt | |
| 2004/0249643 A1 | 12/2004 | Ouyang et al. | |
| 2005/0267774 A1* | 12/2005 | Merritt | G06Q 10/0637 705/306 |

OTHER PUBLICATIONS

Kroll, "Guaranteed-replacement coverage fading fast", Bankrate.com, Oct. 12, 2004, pp. 1-2.*
Howard, "Auto Insurance Claims—General", http://ican2000.com/ussetauto.html, Apr. 14, 2004, pp. 1-6.*
Woller, "Is Your Car Worth Less Than Your Loan?", http://www.wolleranger.com/lessthanloan.html, Feb. 1, 2001, pp. 1-2.*
Fairhall, John, "Accidents don't always raise insurance rate," The Courier, Jan. 1, 1984, p. 2C.
Anonymous—How Forgiving is your Auto Insurance? Changing Times (pre-1986); Nov. 1984; 38, 011; ABI/INFORM p. 42.
Niche Insurance Companies. Stewart Economics, Inc. 1997. http://www.stewarteconomics.com/Niches.pdf.
U.S. Office Action dated Nov. 20, 2013 in U.S. Appl. No. 13/905,957.
Amendment Submitted/Entered with Filing of CPA/RCE filed Mar. 19, 2013 for U.S. Appl. No. 11/774,423.
Filing Postcard for Application for Systems and Methods for Customizing Insurance; dated Nov. 19, 2005.
Filing Postcard for New Application for Systems and Methods for Customizing Insurance; dated Nov. 10, 2005.
Filing Postcard for New U.S. Provisional Application for Systems and Methods for Customizing Insurance; dated Nov. 19, 2004.
Filing Postcard for New U.S. Provisional Application for Systems and Methods for Customizing Insurance; dated Nov. 29, 2004.
Filing Postcard for U.S. Appl. No. 60/629,318 for Systems and Methods for Customizing Insurance; dated Feb. 7, 2005.
Amendment/Request Reconsideration After Final Rejection filed Dec. 12, 2012 for U.S. Appl. No. 12/426,667.
Amendment/Request Reconsideration After Non-Final Rejection filed Jan. 22, 2014 in U.S. Appl. No. 13/730,079.
Examiner Interview Summary Record dated Dec. 20, 2013 for U.S. Appl. No. 13/730,079.
Amendment/Request Reconsideration After Non-Final Rejection filed Nov. 25, 2013 for U.S. Appl. No. 13/730,079.
Notice of Allowance and Fees Due dated Feb. 14, 2013 for U.S. Appl. No. 13/112,825.
Notice of Allowance and Fees Due dated Oct. 11, 2012 for U.S. Appl. No. 13/112,825.
Notice of Allowance and Fees Due dated Jun. 4, 2013 for U.S. Appl. No. 13/353,232.
Notice of Allowance and Fees Due dated Feb. 20, 2013 for U.S. Appl. No. 13/353,232.
Notice of Allowance and Fees Due dated Dec. 21, 2012 for U.S. Appl. No. 13/353,232.
Non-Final Rejection from USPTO dated Aug. 6, 2009 for U.S. Appl. No. 11/774,442.
Non-Final Rejection from USPTO dated Mar. 26, 2012 for U.S. Appl. No. 12/426,667.
Non-Final Rejection from USPTO dated Oct. 15, 2013 for U.S. Appl. No. 13/353,218.
Non-Final Rejection from USPTO dated Jun. 5, 2013 for U.S. Appl. No. 13/353,218.
Notice of Allowance and Fees Due dated Feb. 15, 2013 for U.S. Appl. No. 13/353,218.
Notice of Allowance and Fees Due dated Dec. 21, 2012 for U.S. Appl. No. 13/353,218.
Final Rejection from USPTO dated Mar. 5, 2014 for U.S. Appl. No. 13/730,079.
Amendment/Request Reconsideration After Non-Final Rejection filed Mar. 10, 2014 in U.S. Appl. No. 11/774,423.
Amendment/Request Reconsideration After Non-Final Rejection filed Mar. 12, 2014 in U.S. Appl. No. 13/353,218.
Examiner Interview Summary Record dated Sep. 30, 2009 for U.S. Appl. No. 11/774,442.
Non-Final Rejection dated Aug. 6, 2009 for U.S. Appl. No. 11/774,442.
Non-Final Rejection dated Aug. 28, 2013 for U.S. Appl. No. 13/730,079.
Non-Final Rejection dated Oct. 10, 2013 for U.S. Appl. No. 11/774,423.
Epinions, Progressive Group—Auto Review, Jan. 2, 2001, pp. 1-4.
Non-Final Rejection dated Oct. 18, 2013 U.S. Appl. No. 14/018,913.
Amendment/Request Reconsideration After Non-Final Rejection filed Mar. 18, 2014 for U.S. Appl. No. 14/018,913.
Amendment/Request Reconsideration After Non-Final Rejection filed Apr. 21, 2014 for U.S. Appl. No. 13/905,957.
Amendment/Request Reconsideration After Final Rejection filed Apr. 24, 2014 for U.S. Appl. No. 13/730,079.
Non-Final Rejection dated May 22, 2009 for U.S. Appl. No. 11/551,595.
Final Rejection dated Dec. 8, 2009 for U.S. Appl. No. 11/551,595.
Final Rejection dated Dec. 16, 2009 for U.S. Appl. No. 11/774,442.
Non-Final Rejection dated Jan. 11, 2012 for U.S. Appl. No. 12/959,108.
Non-Final Rejection dated Apr. 12, 2012 for U.S. Appl. No. 13/112,825.
Amendment/Request Reconsideration After Non-Final Reject filed on Aug. 15, 2012 for U.S. Appl. No. 11/774,423.
Non-Final Rejection from USPTO dated May 18, 2012 for U.S. Appl. No. 11/774,423.
Amendment Submitted enter with filing of CPA/RCE filed Mar. 9, 2012 for U.S. Appl. No. 11/774,423.
Final Rejection dated Sep. 13, 2011 for U.S. Appl. No. 11/774,423.
Amendment/Request Reconsideration After Non-Final Reject filed Aug. 31, 2011 for U.S. Appl. No. 11/774,423.
Non-Final Rejection dated Mar. 8, 2011 for U.S. Appl. No. 11/774,423.
Amendment Submitted Entered with Filing of CPA/RCE filed on Mar. 2, 2011 for U.S. Appl. No. 11/774,423.
Final Rejection dated Dec. 6, 2010 for U.S. Appl. No. 11/774,423.
Amendment/Request Reconsideration After Non-Final Rejection filed Dec. 1, 2010 for U.S. Appl. No. 11/774,423.
Non-Final Rejection dated Sep. 7, 2010 for U.S. Appl. No. 11/774,423.
Amendment Submitted/Entered with Filing of CPA/RCE on Aug. 31, 2010 for U.S. Appl. No. 11/774,423.
Final Rejection dated Mar. 10, 2010 for U.S. Appl. No. 11/774,423.
Amendment/Request Reconsideration After Non-Final Rejection filed Jan. 26, 2010 for U.S. Appl. No. 11/774,423.
Non-Final Rejection dated Nov. 4, 2009 for U.S. Appl. No. 11/774,423.
Advisory Action dated Sep. 10, 2009 for U.S. Appl. No. 11/774,423.
Amendment Submitted entered with Filing of CPA/RCE filed Aug. 14, 2009 for U.S. Appl. No. 11/774,423.
Supplemental Final Rejection dated Jun. 17, 2009 for U.S. Appl. No. 11/774,423.
Final Rejection dated May 27, 2009 for U.S. Appl. No. 11/774,423.
Amendment/Request Reconsideration After Non-Final Rejection filed Mar. 16, 2009 for U.S. Appl. No. 11/774,423.
Examiner Interview Summary Record dated Mar. 6, 2009 for U.S. Appl. No. 11/774,423.

(56) References Cited

OTHER PUBLICATIONS

Non-Final Rejection dated Oct. 15, 2008 for U.S. Appl. No. 11/774,423.
Non-Final Rejection dated Oct. 1, 2009 for U.S. Appl. No. 11/774,409.
Examiner Interview Summary Record dated Sep. 25, 2009 for U.S. Appl. No. 11/774,409.
Final Rejection dated Jun. 12, 2012 for U.S. Appl. No. 12/426,667.
Amendment/Request Reconsideration After Non-Final Rejection filed Apr. 19, 2012 for U.S. Appl. No. 12/426,667.
Amendment/Request Reconsideration-After Non-Final Rejection filed Jan. 3, 2012 for U.S. Appl. No. 12/426,667.
Non-Final Rejection dated Sep. 21, 2011 for U.S. Appl. No. 12/426,667.
Response to Amendment Under Rule 312 dated Jun. 9, 2010 for U.S. Appl. No. 11/551,595.
Amendment after notice of Allowance Rule dated Jun. 2, 2010 for U.S. Appl. No. 11/551,595.
Supplemental Notice of Allowability dated May 27, 2010 for U.S. Appl. No. 11/551,595.
Notice of Allowance and Fees Due dated May 17, 2010 for U.S. Appl. No. 11/551,595.
Amendment Submitted/Entered with Filing of CPA/RCE filed Jan. 26, 2010 for U.S. Appl. No. 11/551,595.
Examiner Interview Summary Record dated Aug. 21, 2009 for U.S. Appl. No. 11/551,595.
Amendment/Request Reconsideration After Non-Final Rejection filed Aug. 21, 2009 for U.S. Appl. No. 11/551,595.
Notice of Allowance and Fees Due dated Jul. 11, 2011 for U.S. Appl. No. 12/903,861.
Amendment/Request Reconsideration After Non-Final Rejection filed May 5, 2011 for U.S. Appl. No. 12/903,861.
Non-Final Rejection dated Feb. 15, 2011 for U.S. Appl. No. 12/903,861.
Certificate of Correction dated Jun. 12, 2012 for U.S. Appl. No. 12/793,325.
Request for Certificate of Correction filed May 9, 2012 for U.S. Appl. No. 12/793,325.
Notice of Allowance and Fees Due dated Jul. 5, 2011 for U.S. Appl. No. 12/793,325.
Amendment/Request Reconsideration After Non-Final Rejection filed May 5, 2011 for U.S. Appl. No. 12/793,325.
Non-Final Rejection dated Feb. 15, 2011 for U.S. Appl. No. 12/793,325.
Notice of Allowance and Fees Due dated May 11, 2012 for U.S. Appl. No. 12/959,108.
Applicant Initiated Interview Summary dated Apr. 6, 2012 for U.S. Appl. No. 12/959,108.
Amendment/Request Reconsideration After Non-Final Rejection filed Mar. 30, 2012 for U.S. Appl. No. 12/959,108.
Amendment Submitted/Entered with filing of CPA/RCE on Aug. 15, 2012 for U.S. Appl. No. 11/774,442.
Final Rejection dated May 21, 2012 for U.S. Appl. No. 11/774,442.
Amendment/Request Reconsideration After Non-Final Rejection filed Mar. 1, 2012 for U.S. Appl. No. 11/744,442.
Non-Final Rejection dated Nov. 23, 2011 for U.S. Appl. No. 11/774,442.
Amendment Submitted/Entered with Filing of CPA/RCE filed on Jan. 26, 2010 for U.S. Appl. No. 11/774,442.
Amendment/Request Reconsideration After Non-Final Rejection filed Oct. 2, 2009 for U.S. Appl. No. 11/774,442.
Notice of Allowance and Fees Due dated May 9, 2012 for U.S. Appl. No. 13/114,805.
Notice of Allowance and Fees Due dated Jul. 10, 2012 for U.S. Appl. No. 13/353,218.
Preliminary Amendment filed May 9, 2012 for U.S. Appl. No. 13/353,218.
Preliminary Amendment filed May 9, 2012 for U.S. Appl. No. 13/353,232.
Final Rejection dated Sep. 19, 2012 for U.S. Appl. No. 11/774,423.
Amendment/Request Reconsideration After Non-Final Rejection filed Sep. 12, 2012 for U.S. Appl. No. 13/112,825.
Notice of Allowance and Fees Due dated Aug. 30, 2012 for U.S. Appl. No. 13/353,232.
Non-Final Rejection dated May 5, 2014 for U.S. Appl. No. 13/730,079.
Epinions, Progressive Group—Auto Review, dated Jan. 2, 2001, pp. 1-4.
The Courier, Accidents don't always raise insurance rate, Jan. 1, 1984, p. 2C.
Progressive, Boat/Personal Watercode 2003-2004 Product Guide & Underwriting Guidelines, 17 pages.
Jan. 12, 2017—U.S. Final Office Action—U.S. Appl. No. 14/311,046.
Jan. 18, 2017—U.S. Non-Final Office Action—U.S. Appl. No. 13/278,432.
Jan. 30, 2017—U.S. Non-Final Office Action—U.S. Appl. No. 14/501,266.
Jan. 20, 2017—U.S. Non-Final Office Action—U.S. Appl. No. 14/018,913.
Charles L McClenahan "Principles of Ratemaking" Dec. 31, 1987.
Feb. 10, 2017—U.S. Non-Final Office Action—U.S. Appl. No. 13/353,218.
Feb. 24, 2017—U.S. Final Office Action—U.S. Appl. No. 13/112,825.
Feb. 24, 2017—U.S. Final Office Action—U.S. Appl. No. 14/501,282.
Mar. 24, 2017—U.S. Final Office Action—U.S. Appl. No. 14/501,287.
Mar. 28, 2017—U.S. Non-Final Office Action—U.S. Appl. No. 11/774,423.
Mar. 24, 2017—U.S. Non-Final Office Action—U.S. Appl. No. 14/501,287.
"Background—Universal Auto vs. Allstate® Your Choice Auto." Jun. 22, 2004.
"Idaho Allstate Your Choice Auto ALSTAR Enhancements." 2003.
"Idaho Your Choice Auto." Jul. 2003.
"Allstate Your Choice Auto 2003." 2003.
Email. "FW: Your Choice Auto—Product Cluster and Strategy Development." Sent. Oct. 21, 2003.
Email. "FW: Msmt Needs for Your Choice Auto—Northeast." Sent May 11, 2004.
Memo. "Your Choice Auto Pricing." Nov. 1, 2003.
Allstate's Responses to Nationwide's First Set of Interrogatories (Nos. 1-10), dated Oct. 15, 2012 Civil Action No. 1:12-CV-03609, N.D.I.L., Eastern Division, Judge Joan H. Lefkow [Subject to Protective Order] .

* cited by examiner

SYSTEMS AND METHODS FOR CUSTOMIZING INSURANCE

CROSS-REFERENCE TO RELATED APPLICATIONS

The present application is a continuation of U.S. patent application Ser. No. 13/730,079 filed on Dec. 28, 2012 and entitled "Systems and Methods for Customizing Insurance," which is a continuation of U.S. patent application Ser. No. 13/353,218 filed on Jan. 18, 2012 and entitled "Systems and Methods for Customizing Insurance," which is a continuation of U.S. patent application Ser. No. 11/774,442 filed on Jul. 6, 2007 and entitled "Systems and Methods for Customizing Insurance," which is a continuation of U.S. patent application Ser. No. 11/270,611, filed Nov. 10, 2005 and entitled "Systems and Methods for Customizing Insurance," which claims priority to U.S. Provisional Application No. 60/629,318, filed Nov. 19, 2004, the entire disclosures of which are hereby incorporated by reference.

TECHNICAL FIELD

The present invention relates to systems and methods for customizing property and casualty insurance and, more particularly, to customizing property and casualty insurance policies according to consumer preferences. The present invention also provides systems and methods to design insurance products in a manner that allows consumers to select insurance packages that include features they consider appropriate for their needs.

BACKGROUND

Today's consumer is more pressed than ever for time. With increasing time demands placed, many consumers do not have much time to shop, and what time they do have seems to be consumed in reviewing the massive amount of information they encounter in shopping. The pressures attendant the time constraints and information can pervade a consumer's shopping experience, including shopping for insurance.

New technologies, however, now make possible aids to help consumers as they make insurance choices in much less time than they could years ago. The challenge is how to harness those technologies.

SUMMARY

A method consistent with the invention provides insurance using a data processing system. The method comprises electronically analyzing, by a processor, data to identify a target population and a set of insurance features desired by the target population; and bundling the set of insurance features into an insurance package.

Another method consistent with the invention provides insurance using a data processing system. The method comprises creating a standard package with a set of insurance features; electronically analyzing, by a processor, data to identify a market segment; identifying insurance features desired by the market segment; and bundling the identified insurance features into an insurance package.

Yet another method consistent with the invention creates an insurance package using a data processing system. The method comprises creating a standard package with a set of insurance features; electronically analyzing, by a processor, data gathered through consumer research to identify a target population; identifying insurance features desired by the target population; and bundling the identified insurance features into an insurance package.

A system consistent with the invention provides optimized insurance. The system comprises a memory; a server coupled to a network, wherein the server executes program instructions for an optimization process; and a terminal coupled to the network, wherein the terminal allows a user to execute the optimization process to create an insurance package.

Another method consistent with the invention provides insurance using a data processing system. The method comprises retrieving, from a database, a profile of a customer accessing a website; electronically identifying, by a processor, profiles of customers in common with the profile of a customer; and presenting an insurance package to the customer for consideration that is based upon a comparison of the profile of the customer and the identified profiles.

Another system consistent with the invention provides insurance. The system comprises a database, the database storing a profile of a customer accessing a website; and a processor, the processor identifying profiles of customers in common with the profile of a customer and presenting an insurance package to the customer for consideration that is based upon a comparison of the profile of the customer and the identified profiles.

Both the foregoing general description and the following detailed description are exemplary and explanatory only and do not restrict the claimed invention.

BRIEF DESCRIPTION OF DRAWINGS

The accompanying drawings, which are incorporated in and constitute a part of this specification, illustrate embodiments of the invention and, together with the description, explain the principles of the invention. In the drawings.

DETAILED DESCRIPTION

Figure 1:
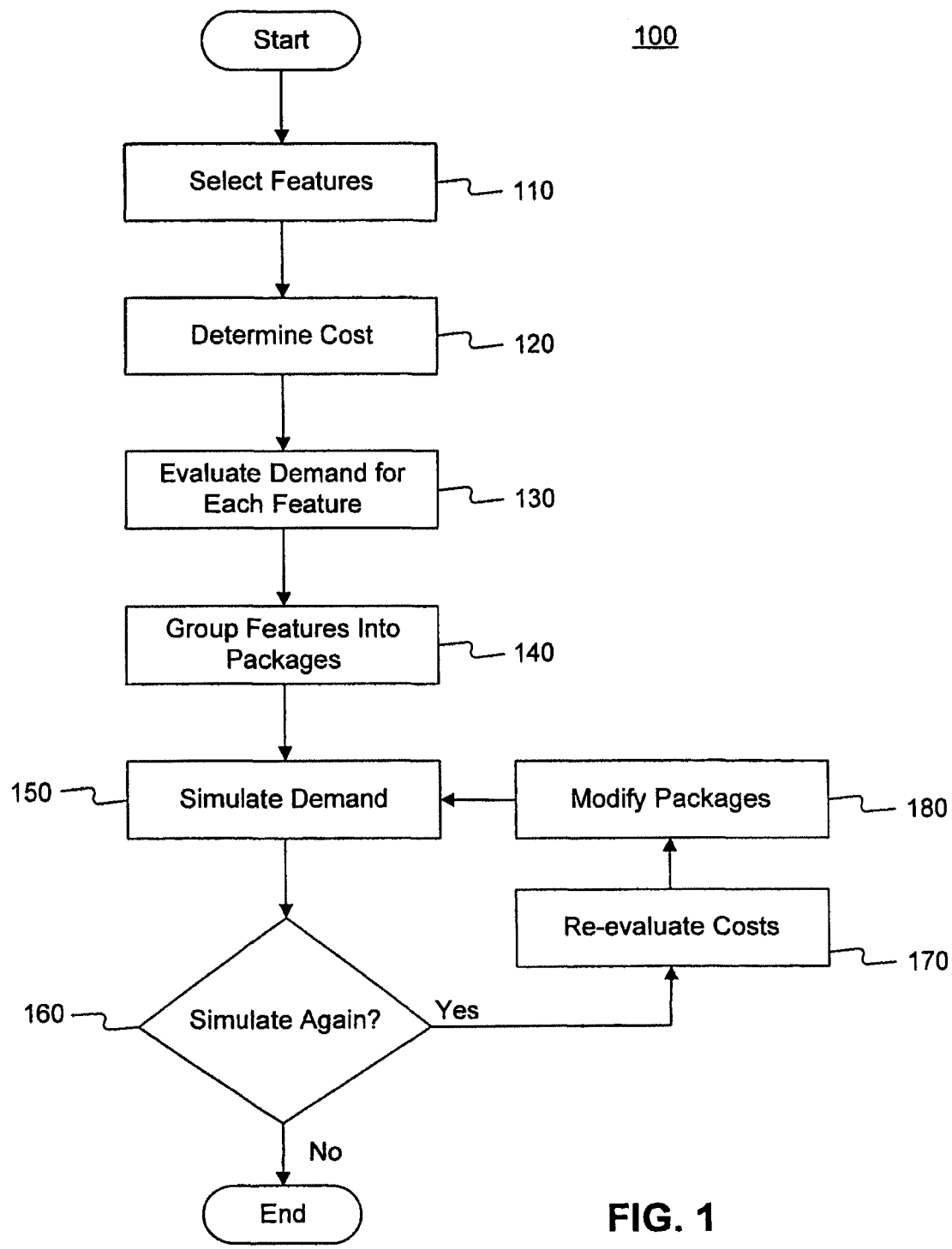
FIG. 1 is an exemplary flowchart for optimizing insurance products.

Generally, insurance is an agreement by which an insurer, sometimes referred to as an underwriter, undertakes to indemnify the insured party against loss, damage, or liability arising from certain risks. The consideration paid by an insured party is typically referred to as a premium, which is paid to keep the insurance in effect. In general, an insurance policy is a contract of insurance that defines the rights and duties of the contracting parties. A typical insurance policy includes limits on the amount of risk that the insurer will cover.

For the purposes of this application, an insurance product includes more than the insurance policy. It also includes services, distribution channels, and other components which may impact the customer experience.

Systems and methods consistent with the present invention provide consumers with insurance products that may help them address some of their individual needs or wants by including features that a particular group may find desirable or appropriate. For the purposes of this application, features include coverages, terms, and rewards. Generally, a coverage provides a protection or indemnification to the insured. A term includes any word, phrase, or provision of import that determines the nature and scope of an agreement, such as the coverage grant in an insurance coverage or the premium charged. A reward may include a discount, credit, or benefit provided to the insured upon the occurrence of a specified event.

When a feature is not included in a group, that particular feature is referred to as an "ala carte" feature. Ala carte features refer to coverages, terms, and rewards that are selected by the insured on an individual basis for inclusion in an insurance product.

Features may be grouped together to form a package. For example, the present invention may apply to an automobile insurance product that comprises a package of features. One grouping of features may form a value package for price conscious consumers, another grouping may form a protection plus package providing additional features, and yet another grouping may form a platinum package including yet more additional features. An automobile insurance product may also include a standard package that includes coverages required by state law, such as bodily injury liability coverage and property damage liability coverage. Coverages in a standard package may also include personal injury protection coverage, medical payment coverage, uninsured motorist coverage, underinsured motorist coverage, collision coverage, and comprehensive coverage.

Most states mandate minimum types and levels of insurance coverage for automobile policies. For example, a state may require liability coverage with mandated minimum coverage limits. States can individually make common coverages mandatory or optional. Banks or financial institutions may make other coverages, such as collision and comprehensive, a prerequisite to obtain financing.

An automobile insurance product offering might include standard coverages required by state law and/or financial institutions. Insurance companies may offer other coverages and limits, such as towing reimbursement and car rental reimbursement.

Automobile insurance consumers find value in optional coverages designed around potential risks uniquely associated with driving and or repairing of vehicles. For example, a car rental reimbursement coverage may help pay for the use of a rented vehicle while the insured vehicle is being repaired due to a loss caused by a covered peril.

The following provides a summary of an exemplary basic optimized package, two additional optimized packages, and various exemplary ala carte features that may be added by a consumer to one of the optimized packages. For example, a basic package might include a reduced premium by adding in a few terms. It is designed as an alternative for the customer particularly concerned about price. In particular, a customer may be required to participate in an arrangement that automatically makes periodic (for example, monthly) deductions from the insured's savings or checking account to pay the premium and other charges or fees associated with the insurance. Customers will be charged an early termination fee (such as $100) if the insurance is terminated by the insured, which might include the insured's failure to accept a renewal offer, or terminated for non-payment of premium, within a specified period of time after the package is added.

Another optimized package might offer an accident-waiver enhancement feature and a safe-driving-deductible reward feature. The accident-waiver enhancement feature might specify that the first rate-affecting accident that occurs will not cause the loss of certain discounts or result in the application of any accident surcharges. Subsequent rate-affecting accidents will not cause the loss of the discounts or the application of any accident surcharges if the insured has not received this waiver in the thirty-six month experience period ending on the date of the accident.

The safe-driving deductible reward feature might provide, upon enrollment, that the customer will receive an initial reduction (such as $100) in his or her collision deductible. For each twelve-month experience period the policy is not assigned an accident, the insured will receive an additional reduction (up to a maximum $500 reduction) in their collision deductible that will apply to all covered collision claims during the next policy period.

Yet another optimized package might offer an accident waiver enhancement plus feature, a safe-driving deductible reward feature, and a safe-driving bonus feature. With the accident-waiver enhancement plus feature, neither a single accident nor multiple accidents will cause the loss of certain discounts or the application of accident surcharges as long as the accidents occur while this feature is part of the policy. The safe-driving bonus feature may provide if the policy is not assigned an accident for a designated six-month experience period, the insured will receive 5% of their previous term's premium for major coverages as a credit that can be applied toward the next six-month premium.

Both the above-described exemplary optimized packages may also allow the customer the opportunity to add, for an additional premium, an additional feature in the form of a new car expanded protection coverage feature on an automobile that has collision and comprehensive coverages. The coverage provided by this feature will continue while collision and comprehensive coverages are maintained and will be removed at the first renewal that is effective in the calendar year that is three years greater than the auto's model year.

The new-car expanded protection coverage feature may provide that, in the event of a covered loss to an automobile other than a total loss, the insurance carrier will pay to repair the auto without a deduction for depreciation. The repair coverage may not apply to losses caused by fire, theft, larceny, or flood. Furthermore, the amount payable will be reduced by any amounts paid or payable under the collision or comprehensive coverages as well as any applicable collision or comprehensive deductible.

The new-car expanded protection coverage feature may also provide that, in the event of a covered total loss, the insurance-carrier will pay to replace the automobile with a new one of the same make and model with the same equipment or, if a new automobile of the same make and model with the same equipment is not available, a new automobile that is similar in size, class, body type and equipment (subject to a price limitation described in the coverage). The replacement coverage may not apply to leased vehicles or to losses caused by fire, theft, larceny, or flood. Furthermore, the amount payable will be reduced by any amounts paid or payable under the collision or comprehensive coverages, any applicable collision or comprehensive deductible, and the dollar amount of any unrepaired damage that occurred prior to the total loss of the automobile.

The new-car expanded protection coverage feature may also provide that, in the event of a covered total loss, if the amount the customer owes under the original automobile loan or automobile lease exceeds the actual cash value of the automobile at the time of loss, the insurance carrier will pay the difference between the amounts. The amount payable may be reduced by any overdue loan or lease payments (and any financial penalties associated with those overdue payments), the transfer or rollover of a previous outstanding loan or lease balance from another vehicle to the original loan or lease for the covered automobile, the dollar amount of unrepaired damage which occurred prior to the total loss, all refunds paid or payable to the customer as a result of the early termination of the automobile loan or automobile lease agreement (including financed warranty/extended service contracts), and any amount paid or payable under the replacement protection of the new car expanded coverage protection feature.

In forming the above exemplary packages that are offered for sale by an insurance carrier, one forming the package offerings might decide to consider consumer "need states" to group features into packages offered for sale. Need states refer to the complex web of rational and subconscious triggers that prompt a consumer to make a product selection. Need states may be prompted by a consumer deciding that he or she needs or wants to obtain a product. Furthermore, they are generally a result of an individual's situation at a particular point in time. Life-stage events, such as a new driver in the family, shift consumers' need states. Of course, automobile insurance consumers may have varied circumstances, and consequently, differing insurance needs and wants. One may be a student with limited resources, and as a result, might select state-mandated coverage. Another may be near retirement and focused on protection of assets and convenience of services.

Systems and methods consistent with the present invention identify distinct groupings of insurance consumers with similar need states and identify the most commonly desired optional features that consumers might chose to help meet their needs. Optional features are then combined by the system into optimized packages of insurance products that are offered for sale to consumers. By grouping features into packages that align with common need states, the offered products will be attractive to persons in need states that were considered when designing the packages.

An "optimized package" includes a set of insurance features that are packaged to help address the needs and wants of consumers in a particular grouping. Ala carte features may also be optimized. For example, ala carte features may be optimized by grouping certain ala carte features together that share an attribute. Accordingly, both optimized features and optimized ala carte features include coverages, terms, and rewards selected from a group that shares an attribute. The shared attribute allows the features to be grouped around a common theme. For example, a value grouping may include features designed around lower price. A protection theme may include features optimized around protecting assets. For the most part, features are grouped to share an attribute, but features grouped around a common theme may also include features that do not share the common theme or are based on a regional theme.

In addition, packages may be grouped to form a "plan." A plan refers to a grouping of a standard package with at least one optimized package of features. A consumer may also add ala carte features, or optimized ala carte features, to a plan on an individual basis.

The process by which packages are designed may involve consideration of market theories. When looking to a market, one needs to identify the individuals that might decide to purchase a product. A group of persons that may be interested in or share a need for a particular product or products is defined as a target population. Accordingly, the target population is the group to be reached through some action or intervention and may refer to groups with specific characteristics.

Market segmentation refers to the process of grouping persons in a target population into smaller subgroups called market segments. A market segment is a group within a heterogeneous market consisting of consumers or organizations with relatively homogeneous needs and wants. Consumers in a market segment are expected to respond to a given set of marketing stimuli in a similar manner. Ideally, individuals within a market segment will likely have similar feelings about a marketing mix comprised of a given product, sold at a given price, distributed in a certain way, and promoted in a certain way. Accordingly, a market segment is a more specifically defined group within the target population.

A target population or a market segment may share one or more common characteristics that statistically describe the persons within the target population or market segment. Characteristics may include gender, age, occupation, marital status, and family size.

To select features that might appeal to a particular target population or market segment, features are grouped together along marketing demand parameters. Groups of features are offered in different product structures, which are discussed in further detail below. Utility-based groupings maximize product acceptance of product packages by statistically predicting consumer demand based on multidimensional analysis of consumer motivations. These motivations are then compiled through a demand simulator to identify and target product requirements that may be attractive to various segments of the consumer population. A demand simulator measures overall demand potential as well as consumer preferences for various product features and brands. By using a demand simulator, it is possible to identify the features that consumers might want most, and then measure the price they are willing to pay for them. Demand simulators are discussed more fully below.

For example, certain features have more universal consumer appeal while other features appeal to a specific consumer characteristic. An optimization process creates focused sets of features. The process may organize product packages around central motivation factors, such as price points and common feature acceptance. Using feature interest as a motivating factor, the most popular features can be grouped to form a set of features that are both universally popular and provide an acceptable profit to an insurance carrier.

Differentiation is introduced by adding features to packages that specifically address the motivations of a specific consumer group. For example, some consumer groups are interested in security features, while others may have young drivers in the household. Because some consumers are highly driven by features while others are driven by price, package structures may be optimized based on price to motivate a consumer segment. Alternatively, package structures may be optimized based on features that appeal to less price-sensitive members of the consumer population. In addition, some optimized package structures may be based upon both price and feature considerations.

Insurance products generated according to the present invention may be offered for sale in a variety of manners. For example, consistent with the present invention, optimized packages may be offered through any form of visual display, either electronically or by the use of brochures, posters, signs, standing displays, and any other form of visual and/or written communication. In addition, one may offer optimized packages through an insurance carrier's agents in person, over the telephone, or via the Internet. In an Internet implementation, or over the telephone using a voice recognition system, such interactions may occur automatically.

Reference will now be made in detail to exemplary embodiments of the invention, examples of which are illustrated in the accompanying drawings. Wherever possible, the same reference numbers will be used throughout the drawings to refer to the same or like parts.

FIG. 1 is an exemplary flow chart 100 for optimizing customizable insurance products. One may optimize insurance products by designing packages using a process that takes into account the considerations discussed in further detail below. Furthermore, the process described with respect to FIG. 1 may be implemented to determine packages for a variety of different types of insurance products. For example, the methodology may apply to automobile insurance, homeowners insurance, life insurance, and any other appropriate type of insurance in keeping with the spirit and scope of the present invention.

As shown in FIG. 1, first, features are identified as candidates to be offered as part of various packages, which together form an insurance product. Step 110. To identify those features that one might consider as candidates, business performance data may be analyzed. Business performance data may include different subsets of data obtained by collecting existing information from the marketplace to analyze for trends and to understand the landscape of available options. A possible subset of business performance data is market-share data, which includes industry data used to evaluate current levels of market share for particular consumers to determine demand generated by specific product offerings. In this step of the process, one might identify a target population and/or a market segment.

Other categories of data considered in this step include industry-product-offering data and internal-pricing data. Industry-product-offering data includes an evaluation of the products and features offered in policies from various insurance carriers. In addition, this data may be supplemented by internal pricing data proprietary to the insurance carrier conducting the demand simulation.

Internal-pricing data may include the insurance carrier's premiums, loss, and expense data so that the cost of features can be taken into account. Internal-pricing data allows one to compare a specific insurance carrier's ability to provide a product to consumers at a price consumers are willing to pay. Other ways of arriving at candidate features include brainstorming with experts, examining the current and past marketplace, and by soliciting and receiving suggestions and input from consumers and agents.

Next, the cost of each candidate feature is determined. Step 120. In determining costs of the candidate features, the losses that are expected for a particular feature are examined when determining the premium that consumers will pay.

Once candidate features and costs are determined, the demand for each feature in the marketplace is evaluated. Step 130. During the evaluation, consumer preferences are evaluated to form price utility curves, which are created after conducting consumer research to better understand consumer preferences for each feature or combination of features.

The process of evaluating demand may include collecting information using focus groups selected from different geographic regions. For example, persons participating in focus groups can be selected across all age groups that have actively shopped for insurance during an appropriate time frame. Selection of groups may occur on the basis of any identified target population and/or market segment. During this step, features may be eliminated from further consideration based upon the focus groups' preferences. In addition, focus groups may provide survey information identifying the price each individual was willing to pay for certain features. Such considerations may involve an evaluation of sample packages containing different combinations of features offered at different prices.

Next, features are grouped into possible packages. Step 140. During this step, cost prohibitive features may be eliminated from packages because consumers may not be willing to pay the price of a particular feature. Also, strategic alternatives data may be examined, including price-point data and variable-feature-level data. Price point data includes an evaluation of a particular insurance carrier's current prices to competitors' prices and includes an evaluation of the impact of adding packaged features. Variable feature level data may be considered to describe the most compelling packages of features. Variable feature level data is derived from consumer research and includes uniqueness and differentiation of features to evaluate the best features and how features should be grouped in packages.

In addition, incremental costs of strategic alternatives data include variable-feature-cost data and fixed-cost-investments data. Variable-feature-cost data describes an insurance carrier's proprietary loss and expense data and is used to determine a cost to offer a given feature. Fixed-cost investments data takes into account systems, infrastructure, and other costs associated with implementation of an optimized product architecture.

When designing packages, another concept that is incorporated into the process is that of self-selection. For example, packages should include features that appeal to consumers in a particular need state such that these consumers will recognize the value of a particular package and consider including it in their insurance selections.

Next, demand is simulated using a demand simulator. Step 150. The demand simulator estimates the number of individuals that will purchase a particular product offering. Optimization of packages is accomplished by iteratively trying all possible package combinations or by determining which features may be substituted for other features in the most optimal packages to arrive at a set of features that a consumer would find of value.

The demand simulator may be implemented as a software module, which processes data provided to it. During the operation of the demand simulator, user input may provide the ability to select different features and to alter inputs to the module. Consistent with the present invention, processing may also occur automatically at the direction of optimization software including automated logic.

Features that are used by the demand simulator may be selected with utility-based product segmentation. As discussed above, price-utility curve data may be used to determine packages. A utility value for each feature may be determined through consumer research to identify the features most attractive to the overall target population as well as to subsets of the target population that form market segments. Features are then grouped into packages, and groups of packages form an insurance product.

After the demand simulator provides an initial processing of features, a user may decide whether to simulate demand again. Step 160. If the user decides to stop, the process ends. If the user decides to continue, the process goes to step 170. In step 170, processing may be further refined by re-examining costs of packages or by examining different feature combinations based on a particular set of judgment criteria. For example, if the cost of offering a particular package is high, it may be identified using variable-feature-cost data and fixed-cost investment data, as described above in connection with step 120.

After inspecting the costs, certain features may be removed or added to packages. Step 180. User input may further provide the ability to select different features and to alter inputs to the module. The process then returns to simulate demand for the newly modified packages. Step 150.

Figure 2:
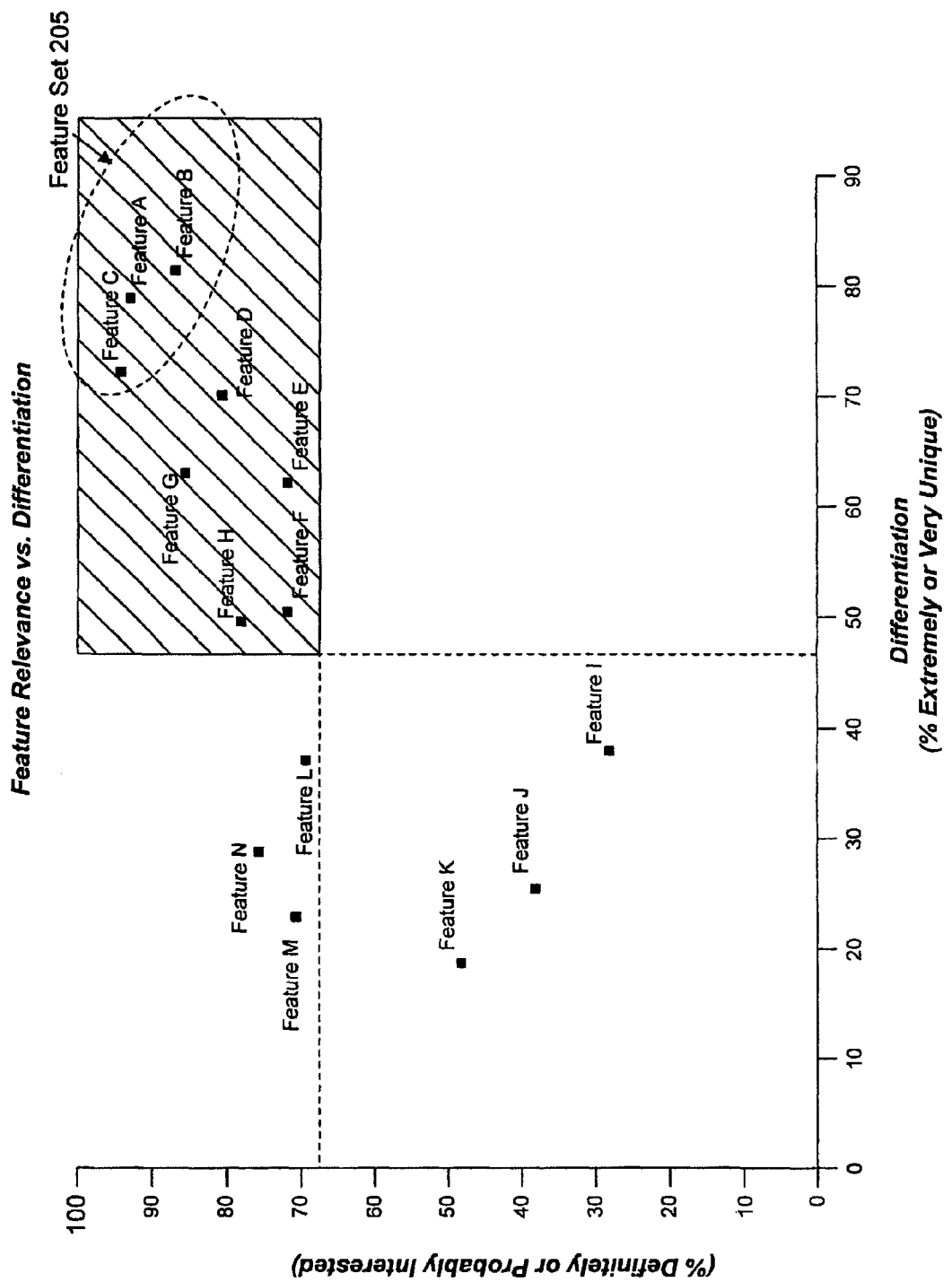
FIG. 2 is an exemplary chart comparing feature relevance and feature differentiation.

FIG. 2 shows an exemplary chart comparing feature relevance and feature differentiation used to perform analysis used in optimizing features for packages. By plotting the data as shown in FIG. 2, it is possible to determine a feature set 205 that includes features that are highly relevant and distinctive. Such a process may be done for an entire population to arrive at feature set 205 and may also be done for sub-segments based on characteristics common to the sub-segments to determine the packages that most appeal to a particular group or subgroup.

Accordingly, research may be performed to identify a target population and a set of insurance features desired by the target population. The set of insurance features are bundled into an insurance package. A cost of the insurance package may be determined and the insurance package may be offered for sale.

Furthermore, the research to identify the insurance features is carried out through an optimization process, as described above. In some embodiments, the optimization process is based upon consumer factors. In other embodiments, the optimization process is based also upon financial criteria that provide the insurance company with an acceptable profit. The research may also include examining common characteristics of the target population or of a market segment within the target population.

This procedure may be repeated for additional market segments. A set of ala carte features may also be identified and a cost for each of the ala carte features may also be identified, along with determining corresponding prices for the ala carte features and offering the ala carte features for sale at the corresponding prices.

An optimized package includes a basic set of insurance features and may be offered for sale along with the insurance package. A standard package may include a set of insurance features required by a governing law. Alternatively, a standard package may also include a set of insurance features required by a financial institution.

For example, an optimized package may additionally include a set of insurance features created by performing research to identify a target population or a market segment. Alternatively, a standard package may also be combined with the optimized package to form a plan. Sets of additional insurance features may also be selected to form additional packages. Each plan may include a standard package and an optimized package.

In addition, a third party may sell optimized packages without a standard package. Such a situation might involve a third party's sale of optimized packages as additions to an existing insurance product. An insurance carrier has sold the existing insurance product to a consumer, who has then gone to a third party from which the consumer may obtain the optimized packages. The optimized packages, however, may be created or selected consistent with the principles of the present invention.

Figure 3:
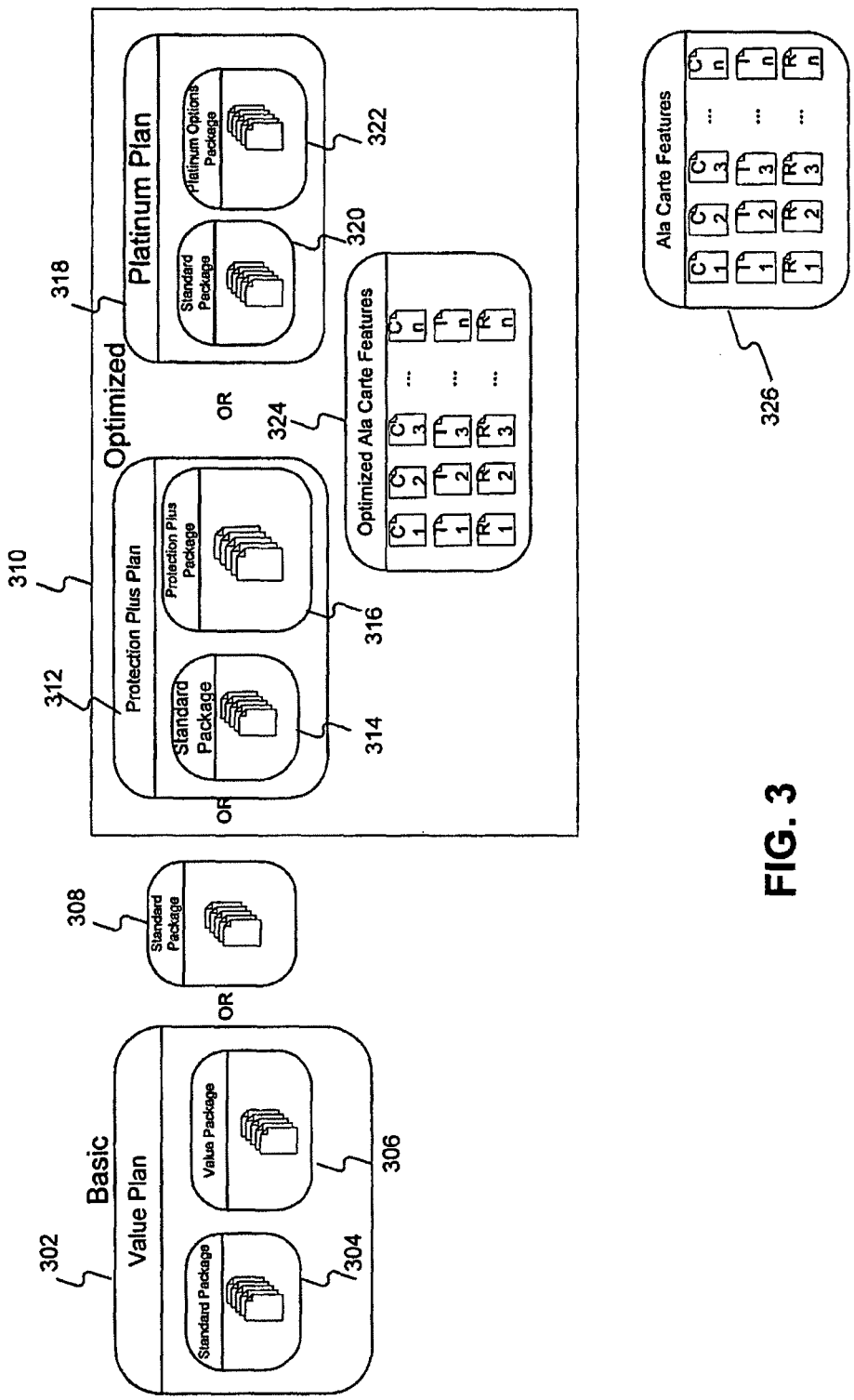
FIG. 3 is an exemplary method of offering insurance consistent with the principles of the present invention.

FIG. 3 is an exemplary method of selling insurance consistent with the present invention. As shown in FIG. 3, a consumer is offered a variety of options related to automobile insurance. For example, a consumer may only want to purchase a basic insurance product. That consumer may select a standard package 308. Alternatively, the consumer may select a value plan 302, which includes a standard package 304 and a value package 306 with additional features.

However, if a consumer would like to purchase more than a basic insurance product, the consumer may select from optimized package group 310. FIG. 3 includes two exemplary optimized packages: a protection plus plan 312 and a platinum plan 318. Protection plus plan 312 includes a standard package 314 and a protection plus package 316. Protection plus package 316 may include features such as a repair/replace feature and a loan/lease-gap coverage feature. Alternatively, the consumer may select platinum plan 318, which includes a standard package 320 and a platinum options package 322. Platinum options package 322 may include features such as a repair/replace feature, a loan/lease-gap coverage feature, a monetary death indemnity feature, and a full roadside assistance feature.

In addition, the consumer may select from optimized ala carte features 324. Optimized ala carte features 324 are individual features sold separately as add-ons to certain optimized packages. Optimized ala carte features 324 have been keyed as a group to share an attribute. In addition, the consumer may also select from a general group of ala carte features 326 that have not been optimized. As shown in FIG. 3, there are many possible combinations and variations from which a consumer may select to from an insurance product.

Figure 4:
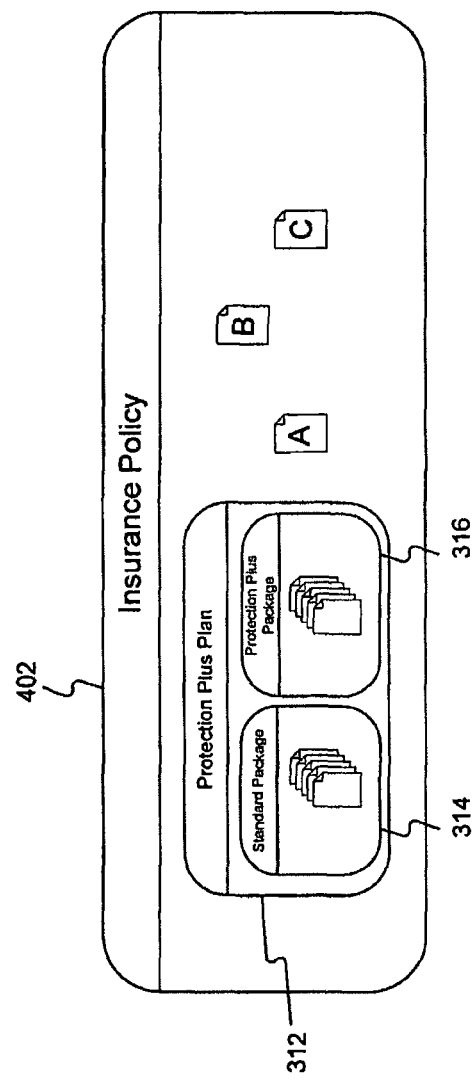
FIG. 4 shows an exemplary insurance product comprising packages selected from FIG. 3.

FIG. 4 shows an exemplary insurance product comprising packages selected from FIG. 3. The example shown in FIG. 4 displays a possible selection that a consumer may make from the options provided in FIG. 3 to form insurance product 402. Insurance product 402 includes protection plus plan 312, which includes standard package 314 and protection plus package 316. In addition, insurance product 402 includes several ala carte features labeled A, B, and C, which may or may not be optimized.

Figure 5:
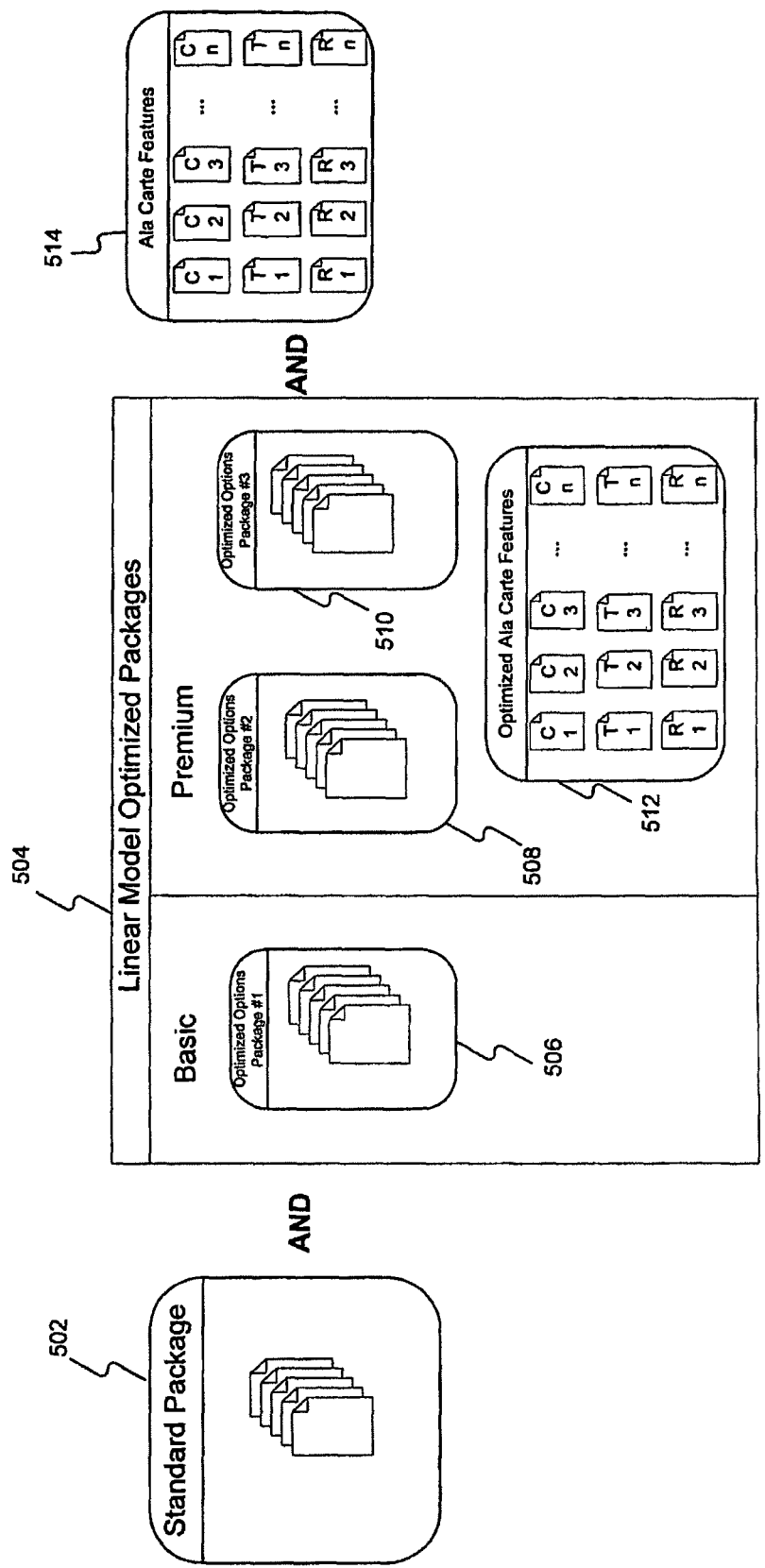
FIG. 5 is another exemplary method of offering insurance consistent with the principles of the present invention.

FIG. 5 is another exemplary method of selling insurance consistent with the present invention. In the method shown in FIG. 5, a consumer combines packages in a linear fashion to form an insurance product. For example, the consumer selects a standard package 502. Since standard package 502 meets the minimum requirements for an insurance product, the consumer may decide only to purchase standard package 502. However, the consumer may also decide to select additional optimized packages from optimized package group 504. For example, the consumer may also select optimized options package 506, which is considered a "basic" optimized package. In addition, however, the consumer may also select optimized options package 508 and/or optimized options package 510. These additional optimized packages are considered "premium" packages because they offer additional features at a cost greater than the basic optimized package. Furthermore, optimized packages 506-510 may include features optimized in a manner consistent with the present invention. In some embodiments, a consumer may be required to first select, for example, a particular optimized options package before the consumer may select a further optimized package. Such a "tiered" arrangement requires the purchase of an initial optimized package as a prerequisite before additional optimized packages may be purchased.

Once the consumer has selected optimized options package 508 or optimized options package 510, the consumer may also select any one or more optimized ala carte features 512. Additionally, a consumer that has selected any one of optimized options packages 506-510 may also select one or more ala carte features 514. As shown in FIG. 5, there are many possible combinations and variations from which a consumer may select to form an insurance product.

Figure 6:
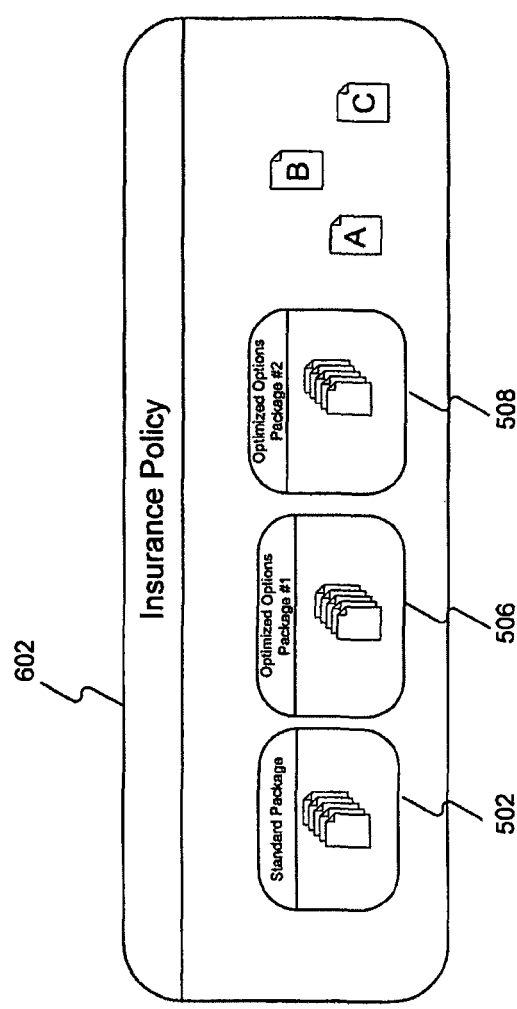
FIG. 6 shows an exemplary insurance product comprising packages selected from FIG. 5.

FIG. 6 shows an exemplary insurance product comprising packages from FIG. 5. The example in FIG. 6 shows a possible selection that a consumer may make to form insurance product 602. Insurance product 602 includes standard package 502, optimized package 506, and optimized package 508. In addition, insurance product 602 includes several ala carte features A, 8, and C, which may or may not be optimized.

With regard to the example of automobile insurance, the following provides an overview of exemplary packages that may be made available to customers. For example, a "standard" package may include an accident waiver feature after five years for eligible customers. A "value" package may be provided at a reduced rate and may require participation in a payment program. The payment program may require premiums to be paid through an automatic deduction from a checking or savings account, for example.

Additional packages may also be available that include more features. A "gold protection" package may include an accident waiver enhancement feature in the event of a first accident and a safe driving deductible reward. A "platinum protection" package may include an accident waiver enhancement plus feature in the event of multiple accidents, a safe driving deductible reward feature, and a safe driving bonus feature. Furthermore, a "new car expanded protection" package may include all of the features included in the "platinum protection" or "gold protection" packages. In addition, the "new car expanded protection" package may include a repair or replacement coverage feature and a loan or lease gap coverage feature.

One of ordinary skill in the art will readily recognize how to adapt the methodologies described above to a variety of areas of insurance. For example, a homeowner's insurance product typically covers a building or structure on the premises and household personal property. A typical homeowner's insurance product usually also includes certain personal liability coverage and coverage for medical payments to others. Additional coverages or features are purchased ala carte.

Consistent with the present invention, an insurance carrier may expand its homeowner's insurance offerings to consumers by identifying features with appeal and profitability to design packages of related features at different pricing points. Customizable homeowner's insurance may include a standard package of typical coverages, and a consumer may further select optimized packages of features in a manner similar to that discussed above.

Homeowner's insurance consistent with the present invention provides optional coverages that reflect different lifestyles and life stage needs. In particular, by implementing a methodology consistent with that described above in relation to automobile insurance, one may also create optimized homeowner packages.

Optimized packages may include coverages that are popular with most homeowners, as well as optimized coverages that align with the wants and needs of a given consumer. Consistent with the invention, consumers can be offered optimized packages of coverages and terms that address the needs of those, for example, with a great deal of electronics, or those with a great deal of jewelry, or those with a particular liability concern.

The following provides examples of homeowners insurance features that may be included in packages that are selected according to the methods described above. For example, a home value protection feature may more fully ensure that a home and valuables are fully covered by automatically adjusting coverage levels to account for the increasing cost to rebuild the home. An identity theft coverage feature may provide coverage for specified expenses that are incurred due to identity theft. A claims free discount feature may provide a discount on the following year's premium for each year in which the policyholder does not have a claim. A blanket protection of valuables feature may allow a policyholder to purchase a set amount of coverage for special valuables in increments of $1,000, rather than scheduling individual items separately. A limited personal umbrella policy provides additional coverage in case of unexpected lawsuits. A water backup feature offers protection in case a home is damaged due to flooding from specified causes. An inventory and appraisal tool feature provides tools available at a website, on a CD-ROM, or in a booklet, that helps catalog and store a complete inventory of valuable items and provides approximate values of itemized goods. One of skill in the art will recognize that other features are consistent with embodiments of the present invention.

Figure 7:
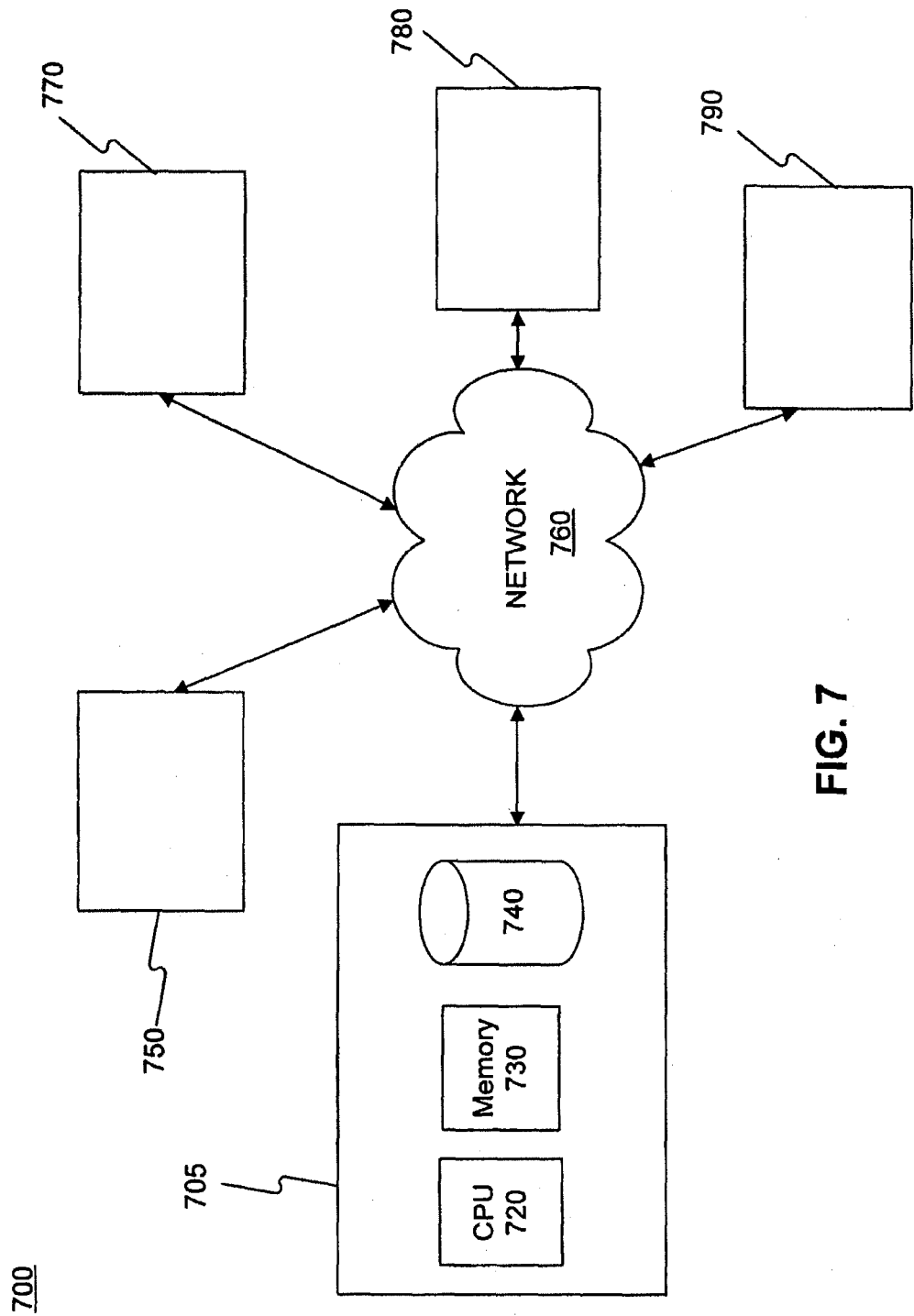
FIG. 7 is an exemplary system consistent with the present invention.

FIG. 7 illustrates a system 700 consistent with the present invention for implementing the methods discussed above. System 700 includes a server 705, connected to a network 760, including a CPU 720, a memory 730, and a database 740. Software loaded into memory 730 from, for example, a disk drive (not shown) at the direction of CPU 720 may be used to implement a program for optimizing automobile insurance in a manner consistent with the present invention. For example, the software may execute instructions for performing demand simulation to analyze data and to form optimized packages. Memory 730 and/or database 740 may store market data and research conducted to design packages. Database 740 may also include information such as customer profiles, which are discussed more fully below.

Additionally, network 760 provides communications between the various entities in system 700, such as user terminals 770-790. Network 760 may be a shared, public, or private network and encompass a wide area or local area. Further, network 760 may be implemented through any suitable combination of wired and/or wireless communication networks. By way of example, network 760 may be implemented through a wide area network (WAN), local area network (LAN), an intranet, or the Internet.

Terminals 770-790 allow a user to exchange information with server 760. Terminals 770-790 may be any type of appropriate device for communicating with server 705 over network 760. For example, terminal 770 may be a PDA running a program for communicating with server 705, while terminal 780 may be a desktop type computer running a web browser for communicating with server 705 via the Internet. Terminal 790 may be a standard landline telephone or wireless phone.

Users may access server 705 via network 760 to customize an automobile insurance product through a web browser running on, for example, terminal 780. A website may include options for the user to provide information or to fill out an application, and may present the user with a series of screens prompting the user to make various selections. The user may make appropriate selections to customize the insurance product. For example, a customer at terminal 790, a telephone, may contact a customer service representative at terminal 750. The customer service representative may assist a customer through a process of providing information and asking a series of questions that help the customer to consider options for customizing an insurance product. During the process, the customer service representative may use software running on terminal 750, and may send data to and from server 705 over network 760.

Server 705 may also interact with a customer to determine insurance features to include for the customer's consideration in an insurance package. Customers may further modify or reject presented insurance packages and may also select insurance packages and/or features from other offerings. To determine insurance features to include in an insurance package, server 705 may use database 740 to access customer profiles, or may access customer profiles over network 760. In other embodiments consistent with the present invention, server 705 may access customer profiles over network 760. Further, customer profiles may be updated by a customer service representative at terminal 750, who collects data from a customer and transmits the data over network 760 to server 705. In other embodiments, data may be transmitted from a customer at one of terminals 770-790 over network 760 in response to survey questions and/or as a result of selections that a customer makes after supplying identification information to log into an account. Server 750 may access database 740 to retrieve existing data already collected that pertains to customers.

Customer profiles may include, for example, data identifying a customer, data identifying a customer's automobiles, data pertaining to other property belonging to a customer, and/or data describing a customer's preferences. Data identifying a customer may include information such as a customer's name, address, age, and marital status. Data identifying a customer's automobiles may specify the number owned, as well as each automobile's make, model, and year. Data pertaining to other property belonging to a customer may include information about homes, jewelry, artwork, and other possessions. Data describing a customer's preferences may be collected through various surveys, both from electronically collected information and information collected from surveys sent via mail. Customer preferences may indicate preferred insurance features, target costs, and preferred mode of customer service contact, such as whether a customer prefers to be connected by telephone or electronic mail. Customer profiles may also include information collected from a customer that specifies a customer's risk tolerance.

Figure 8:
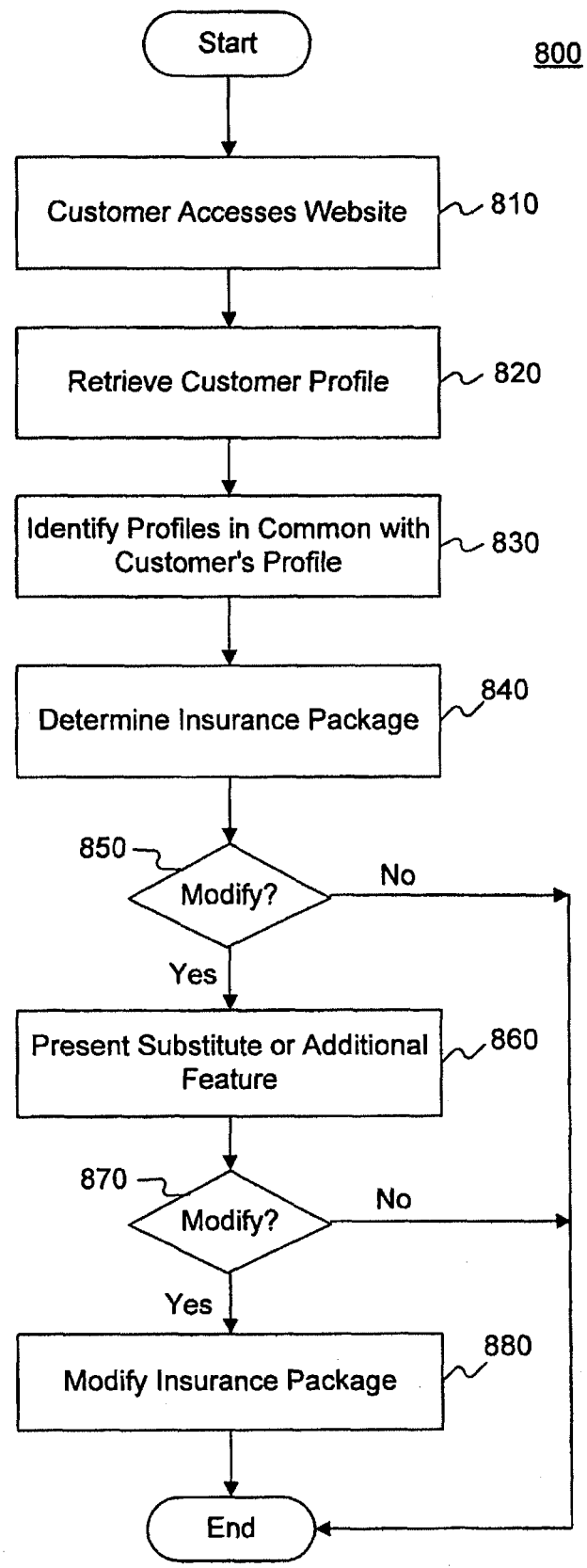
FIG. 8 is an exemplary flowchart for presenting insurance packages to a customer for the customer's consideration, consistent with an embodiment of the present invention.

Referring now to FIG. 8, an exemplary flow chart 800 is provided for presenting insurance packages to a customer for the customer's consideration. One or more of the insurance packages that are presented for the customer's consideration may be based upon a customer profile in one embodiment of the present invention. A customer at, for example, one of terminals 770-790, may navigate using an Internet browser to a website for an insurance company. At the website, the customer may log into an existing account or create a new account by providing, for example, a name and a password. Step 810. In other embodiments, a customer may not need to create an account or log into an account, but may instead provide identification information to begin the process, such as the customer's name.

Next, in step 820, CPU 720 may access a customer profile stored in, for example, database 740, which is associated with the customer that supplied identification information at the website. As discussed above, customer profile may include a variety of data concerning the customer. In step 830, CPU 720 may identify profiles for other customers that include data in common with the data included in the profile of the customer. For example, if the customer owns a particular make and model of automobile, CPU 720 may identify profiles of other customers that own the same automobile.

Next, in step 840, CPU 720 determines an insurance package to present to the customer for consideration based upon a comparison of the customer's profile and the identified profiles. For example, this step may include presenting an insurance package to the customer that was selected by one or more customers associated with identified profiles. Further, the process may involve determining which insurance package was selected by a majority of customers having certain characteristics in common with the customer. A customer may be presented for consideration, in one example, an insurance package that was selected by a majority of customers that own the same automobile make and model. In such an example, the presentation of the insurance package may be accompanied by a message to the customer. The message may state, for example, "You may be interested in the following package, which was selected by other customers that own your type of automobile." Insurance packages that are presented to a customer for consideration may be selected by CPU 720 from a comprehensive database connected to network 760 and/or from database 740 included in server 705, for example. Furthermore, multiple processors (not shown) may be used by server 705 to implement parallel processing to rapidly process large volumes of data, including customer profiles, when selecting presented insurance features and/or insurance packages. Customers may further modify or reject presented insurance packages and may also select insurance packages and/or features from other offerings. One of ordinary skill in the art will recognize that the number of characteristics in common, as well as the characteristics to consider when making the comparison may vary. Accordingly, one of ordinary skill in the art will appreciate that many variations are possible and consistent with the spirit and scope of the present invention.

Once an insurance package is selected, server 705 may transmit the insurance package over network 760 to a customer at one of terminals 770-790. The details concerning the insurance package, including the particular insurance features included in the package, are then displayed to the customer for the customer's consideration on one of terminals 770-790. Furthermore, an insurance package is presented for the customer's consideration so that the customer may ultimately consider whether the insurance best suits the customer's needs. A customer may further be provided with a message encouraging the customer to consider other alternatives and evaluate whether the presented insurance package meets the customer's needs.

In some situations, a customer may prefer to speak with a customer service representative during the process. A customer may be provided with a telephone number at any point in the process to review insurance packages and/or features and speak with a customer service representative. Furthermore, periodically, a message may be displayed to the customer asking whether the customer would like to engage in a live chat session with a customer service representative. Alternatively, an option may be made available on the customer's display so that the customer may, when desired, initiate a live Internet chat session with a customer service representative. During the Internet chat session, a customer service representative and a customer may exchange text messages. For example, consistent with the system shown in FIG. 7, a customer may have a question about an insurance package or feature. The customer may compose a text message, which may be transmitted from the customer at, for example, terminal 770 over network 760 to a customer service representative at terminal 750. The customer service representative may respond with a text message transmitted from terminal 750 to terminal 770. Accordingly, during the chat session, the customer may resolve questions pertaining to presented insurance packages and/or features.

Additionally, customers may further modify or reject presented insurance packages and may also select insurance packages and/or features from other offerings. For example, server 705 may receive an indication from the customer specifying whether the customer would like to modify or reject the presented insurance package, according to step 850. In step 850, the customer receives a message at one of terminals 770-790 presenting the customer with additional information regarding other available packages and features and prompting the customer to indicate whether the customer would like to modify or reject the presented insurance package and features. If the customer does not wish to modify or reject the presented insurance package and features, the process ends.

If the customer would like to modify or reject the presented insurance package, server 705 may present a substitute or additional insurance feature that may be included in the insurance package that is presented. Step 860. Customers may further modify or reject presented insurance packages and may also select insurance packages or features from other offerings. In this step, server 705 may present a substitute insurance feature based on the customer profile for the customer's consideration, which may be exchanged for an insurance feature already included in the insurance package. Alternatively, server 705 may present an additional insurance feature based on the customer profile for the customer's consideration, which may be added to the insurance package. In other embodiments, the substitute or additional insurance feature may be selected based upon an analysis of the identified profiles of customers having characteristics in common with the customer and presented for the customer's consideration. Further, the substitute or additional insurance feature that is presented for consideration may be selected based upon an analysis of market research saved in database 740. For example, market research previously collected for a target population may indicate preferences of individuals falling within the target population. The customer profile may therefore be used to identify whether a particular customer is or is not a member of a particular target population. Still further, the substitute or additional insurance feature may be selected by the customer. For example, the customer may specify a desired insurance feature or select an insurance feature from a list of all available features.

In step 870, the customer may decide whether to modify the presented insurance package to include an additional insurance feature or to substitute an insurance feature. Next, if the customer makes a change in the insurance package, in step 880, server 705 modifies the insurance package to include the additional insurance feature or to substitute an insurance feature. A customer may also change the insurance package by removing one or more insurance features. If the customer does not want to include, substitute, or remove an insurance feature, the process ends.

The above method allows a customer to adapt an insurance package to the customer's needs with insurance features that server 705 presents to the customer for consideration. Further, once a customer has been provided an insurance package for consideration, the customer may replace, reject, and/or add other available insurance features as the customer deems necessary. One of ordinary skill in the art will recognize that the above process may iteratively allow a customer to refine the insurance package by substituting, removing, and adding features until a desired package is arrived at that the customer believes best suits his or her needs. Additional or substitute insurance features that are presented to the customer for consideration as part of an insurance package may be based on a profile of the customer, other customer profiles, or market research, for example.

As discussed herein, personal automobile and homeowners insurance are examples of property and casualty insurance offerings. One skilled in the art will recognize that the above-described methodology is applicable to other types of insurance products as well, such as commercial insurance for business customers. In addition, an insurance carrier may offer annuity products to consumers for retirement or financial planning purposes by identifying features with appeal and profitability to design packages of related features at different pricing points or expense levels. Customizable annuity products may include a standard annuity with typical accumulation, return, and payout features. A consumer may further select enhanced packages of features in a manner similar to that discussed above for automobile insurance.

Additional embodiments of the present invention are possible, each designed to cover other classes of insurable risk, including but not limited to, mortality risk and life insurance products; morbidity risk and health and long-term care insurance products; as well as professional practice risk and liability insurance.

Although not common in today's marketplace, it is possible to apply the disclosed methodologies to so-called hybrid or multi-risk products that combine the coverages of two or more products from different classes of insurance risk into a single product. Customizable hybrid products may include a standard package across two or more risk classes with typical features in each class and a consumer may further select enhanced packages of features in a manner similar to that discussed above for automobile insurance.

The foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described implementation includes software but the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents. Accordingly, other embodiments of the invention will be apparent to those skilled in the art from consideration of the specification and practice of the invention disclosed herein. The specification and examples should be considered as exemplary only, with a true scope and spirit of the invention being indicated by the following claims.

What is claimed is:

1. An insurance package customization system of an insurance company comprising:
   an insurance customer terminal that includes a display, an input device, at least one processor, and a memory;
   an insurance package customization server that includes a memory and at least one processor;
   a computer network that connects the insurance customer terminal to the insurance package customization server;
   an automobile insurance package that includes an automobile replacement coverage feature;
   an automobile that is covered by the automobile insurance package when the automobile insurance package is selected by an insurance customer;
   a replacement automobile available under the automobile replacement coverage feature that has a same make, a same model, and similar equipment as the automobile covered by the automobile insurance package;
   wherein the insurance customer terminal is configured to
      provide access to an insurance company website via a web browser,
      receive insurance customer identification information from the insurance customer,
      transmit the insurance customer identification information to the insurance package customization server,
      receive information corresponding to the automobile insurance package from the insurance package customization server that at least includes a premium for the automobile insurance package,
      present the information corresponding to the automobile insurance package at the display,
      receive at the input device an indication of a selection of the automobile insurance package from the insurance customer, and
      transmit the indication of the selection of the automobile insurance package to the insurance package customization server;
   wherein the insurance package customization server is configured to
      receive the insurance customer identification information from the insurance customer terminal,
      select the automobile insurance package in response to receipt of the insurance customer identification information,
      determine the premium for the automobile insurance package,
      transmit the information corresponding to the automobile insurance package to the insurance customer terminal,
      receive the indication of the selection of the automobile insurance package from the insurance customer terminal, and
      determine the automobile is covered under the automobile insurance package in response to receipt of the indication of the selection of the automobile insurance package;
   wherein the automobile replacement coverage feature provides that, upon a total loss of the automobile and in response to a determination that the automobile replacement coverage feature applies to the total loss, the insurance company will pay to replace the automobile with the replacement automobile subject to a depreciation value associated with the automobile; and
   wherein the automobile insurance package provides that the automobile replacement coverage feature is in effect while a collision coverage feature and a comprehensive coverage feature of the automobile insurance package are in effect and until a renewal of the automobile insurance package that is effective in a calendar year that is three years greater than a model year of the automobile.

2. The insurance package customization system of claim 1 further comprising a server configured to
   receive notice of a loss associated with the automobile covered by the automobile insurance package,
   determine that the loss is the total loss,
   determine whether the automobile replacement coverage feature applies to the total loss, and
   responsive to a determination that the automobile replacement coverage feature applies to the total loss, calculate a replacement amount for replacing the automobile with the replacement automobile.

3. The insurance package customization system of claim 2 wherein:
   the server, when calculating the replacement amount, is further configured to calculate a reduction amount and to reduce the replacement amount based on the reduction amount; and
   the reduction amount includes at least one of
      an amount payable on at least one coverage feature of the automobile insurance package,
      a deductible specified by the automobile insurance package,
      the depreciation value associated with the automobile covered by the automobile insurance package, and
      combinations thereof.

4. The insurance package customization system of claim 1 wherein:
   the automobile insurance package further includes a repair coverage feature that provides that, upon a loss of the automobile that is not the total loss of the automobile and in response to a determination that the repair coverage feature applies to the loss, the insurance company will pay to repair the automobile without deducting for depreciation of the automobile.

5. The insurance package customization system of claim 4 further comprising a server configured to
   receive notice of the loss associated with the automobile covered by the automobile insurance package,
   determine that the loss is not the total loss of the automobile,
   determine whether the repair coverage feature applies to the loss, and
   responsive to a determination that the repair coverage feature applies to the loss, calculate a repair amount for repairing the automobile.

6. The insurance package customization system of claim 5 wherein:
   the server, when calculating the repair amount, is further configured to calculate a reduction amount and to reduce the repair amount based on the reduction amount; and
   the reduction amount includes at least one of
      an amount payable on at least one coverage feature of the automobile insurance package,
      a deductible specified by the automobile insurance package, and
      combinations thereof.

7. The insurance package customization system of claim 1 wherein the automobile insurance package further includes a protection coverage feature that provides that, upon the total loss of the automobile and in response to a determination that the protection coverage feature applies to the total loss, the insurance company will pay the insurance customer a difference between a cash value of the automobile and an amount owed under a loan or lease of the automobile that exceeds the cash value.

8. The insurance package customization system of claim 7 further comprising a server configured to
receive notice of a loss associated with the automobile covered by the automobile insurance package,
determine that the loss is the total loss,
determine whether the protection coverage feature applies to the total loss, and
responsive to a determination that the protection coverage feature applies to the total loss, calculate a payment amount corresponding to the difference between the cash value and the amount owed.

9. The insurance package customization system of claim 8 wherein:
the server, when calculating the payment amount, is further configured to calculate a reduction amount and to reduce the payment amount based on the reduction amount; and
the reduction amount includes at least one of
an amount associated with unrepaired damage to the automobile that occurred prior to the total loss,
an overdue loan or lease payment associated the loan or lease of the automobile,
at least one financial penalty associated with the overdue loan or lease payment,
an outstanding balance associated with another loan or lease associated with another automobile owned by the insurance customer,
a refund resulting from early termination of the loan or lease associated with the automobile, and
combinations thereof.

10. The system of claim 1, wherein the insurance package customization server is further configured to determine, based on a target population associated with one or more aspects of the insurance customer identification information, desirable features, and wherein the information corresponding to the automobile insurance package further comprises the desirable features.

11. An insurance system comprising:
at least one processor;
a data store that stores information corresponding to an automobile insurance package having an automobile replacement coverage feature; and
wherein the insurance system is configured to
receive notice of a loss associated with an automobile covered by the automobile insurance package,
determine that the loss is a total loss,
determine whether the automobile replacement coverage feature applies to the total loss, and
responsive to a determination that the automobile replacement coverage feature applies to the total loss, calculate a replacement amount for replacing the automobile with a replacement automobile having a same make, a same model, and similar equipment as the automobile covered by the automobile insurance package,
wherein the automobile replacement coverage feature is in effect until a renewal of the automobile insurance package that is effective in a calendar year that is three years greater than a model year of the automobile.

12. The insurance system of claim 11 wherein the insurance system is further configured to:
initiate a payment to a customer associated with the automobile insurance package responsive to a determination that the automobile replacement coverage feature applies to the total loss; and
the payment is based on the replacement amount for replacing the automobile with the replacement automobile.

13. The insurance system of claim 12 wherein the insurance system is further configured such that, when determining whether the automobile replacement coverage feature applies, the insurance system:
determines whether the automobile covered by the automobile insurance package is a leased automobile; and
determines that the automobile replacement coverage feature does not apply responsive to a determination that the automobile is a leased automobile.

14. The insurance system of claim 12 wherein the insurance system is further configured such that, when determining whether the automobile replacement coverage feature applies, the insurance system:
determines a cause of the total loss; and
determines whether the automobile replacement coverage feature applies based on the cause of the total loss.

15. The insurance system of claim 14 wherein the insurance system is further configured such that, when determining whether the automobile replacement coverage feature applies based on the total loss, the insurance system:
determines that the automobile replacement coverage feature does not apply responsive to a determination that the cause of the total loss is at least one of fire, a theft, a larceny, a flood, and combinations thereof.

16. The insurance system of claim 12 wherein the insurance system is further configured such that, when determining whether the automobile replacement coverage feature applies, the insurance system:
determines whether a collision coverage feature and a comprehensive coverage feature of the automobile insurance package were in effect when the total loss occurred;
determines that the automobile replacement coverage feature applies responsive to a determination that the collision coverage feature and the comprehensive coverage feature were in effect when the total loss occurred; and
determines that the automobile replacement coverage feature does not apply responsive to a determination that the collision coverage feature and the comprehensive coverage feature were not in effect when the total loss occurred.

17. The insurance system of claim 11 wherein the insurance system is further configured to:
determine whether the replacement automobile is available for purchase; and
responsive to a determination that the replacement automobile is not available for purchase, calculate an alternative replacement amount needed to replace the automobile with an alternative replacement automobile have a similar make, a similar model, and similar equipment as the automobile covered by the automobile insurance package.

18. A computer-implemented method of applying an automobile insurance package comprising:

storing, at a data store of an insurance system, information corresponding to an automobile insurance package having an automobile replacement coverage feature;

receiving, at the insurance system, notice of a loss associated with an automobile covered by the automobile insurance package;

determining, using the insurance system, whether the loss is a total loss;

determining, using the insurance system, whether the automobile replacement coverage feature applies to the total loss; and responsive to a determination that the automobile replacement coverage feature applies to the total loss, calculating, using the insurance system, a replacement amount for replacing the automobile with a replacement automobile having a same make, a same model, and similar equipment as the automobile covered by the automobile insurance package;

wherein the insurance system comprises at least one processor and the data store that stores the information corresponding to an automobile insurance package having an automobile replacement coverage feature, and wherein the automobile replacement coverage feature is in effect until a renewal of the automobile insurance package that is effective in a calendar year that is three years greater than a model year of the automobile.

19. The method of claim 18 further comprising:

calculating, using the insurance system, a reduction amount; and reducing the replacement amount, using the insurance system, based on the reduction amount.

20. The method of claim 19 wherein the reduction amount includes an amount payable on at least one coverage feature of the automobile insurance package.

21. The method of claim 19 wherein the reduction amount includes a deductible specified by the automobile insurance package.

22. The method of claim 18 further comprising:

calculating, using the insurance system, an amount owed under a loan or lease of the automobile covered by the automobile insurance package;

calculating, using the insurance system, a cash value of the automobile;

comparing, using the insurance system, the amount owed to the cash value; and responsive to a determination that the amount owed exceeds the cash value, initiating, using the insurance system, a payment to a customer associated with the automobile insurance package wherein the payment corresponds to a difference between the amount owed and the cash value.

23. The method of claim 22 further comprising:

calculating, using the insurance system, a reduction amount to reduce the payment by; and reducing the payment, using the insurance system, based on the reduction amount.

24. The method of claim 23 wherein the reduction amount includes an amount associated with unrepaired damage to the automobile covered by the automobile insurance package that occurred prior to the total loss.

25. The method of claim 23 wherein the reduction amount includes an amount associated with overdue loan or lease payment associated with the automobile covered by the automobile insurance package.

26. The method of claim 25 wherein the reduction amount further includes an amount associated with at least one financial penalty associated with the overdue loan or lease payment.

27. The method of claim 23 wherein the reduction amount includes an amount associated with an outstanding balance associated with another loan or lease associated with another automobile owned by the customer associated with the automobile insurance package.

28. The method of claim 23 wherein:

the reduction amount includes an amount associated with a refund resulting from early termination of a loan or lease agreement associated with the automobile covered by the automobile insurance package; and the refund includes one or more refunds respectively associated with at least one of a financed warranty, an extended service contract, and combinations thereof.

* * * * *